(12) United States Patent
Kumagai et al.

(10) Patent No.: US 6,728,264 B1
(45) Date of Patent: Apr. 27, 2004

(54) RADIO BASE STATION FOR A CDMA MOBILE COMMUNICATION SYSTEM

(75) Inventors: Yoshiaki Kumagai, Kawasaki (JP); Kosuke Nobuyasu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/256,613

(22) Filed: Feb. 23, 1999

(30) Foreign Application Priority Data

Mar. 5, 1998 (JP) .......................................... 10-053256

(51) Int. Cl.$^7$ ................................................. H04J 3/22
(52) U.S. Cl. ....................................... 370/468; 370/335
(58) Field of Search ................................ 370/329, 335, 370/320, 342, 468

(56) References Cited

U.S. PATENT DOCUMENTS

| | | | | |
|---|---|---|---|---|
| 6,005,898 A | * | 12/1999 | Kaewell, Jr. ................ | 375/130 |
| 6,061,339 A | * | 5/2000 | Nieczyporowicz et al. . | 370/329 |
| 6,075,792 A | * | 6/2000 | Ozluturk ..................... | 370/335 |
| 6,081,536 A | * | 6/2000 | Gorsuch et al. ............. | 370/335 |
| 6,317,435 B1 | * | 11/2001 | Tiedemann et al. ......... | 370/441 |

OTHER PUBLICATIONS

T.S. Rappaport, "Wireless Communications: Principles and Practices", pp. 422–425, Prentice Hall (U.S.A.) 1996.

* cited by examiner

*Primary Examiner*—Chi Pham
*Assistant Examiner*—Keith M. George
(74) *Attorney, Agent, or Firm*—Katten Muchin Zavis Rosenman

(57) ABSTRACT

A radio base station in a CDMA mobile communication system for allocating radio channels to mobile stations at a plurality of different bit rates. The base station including a storage part for storing a maximum number of radio channels that makes a signal-to-interference noise power ratio for each channel greater than a predetermined value. The maximum number having a value which changes in steps depending on a bit rate used for a call presently made. A control part for reading the maximum value stored in the storage part and allocating radio channels to the mobile stations in a range that does not exceed the maximum value.

12 Claims, 10 Drawing Sheets

FIG. 6

| COMBINATION NUMBER | COMBINATION OF ALLOCATING RADIO CHANNEL NUMBERS | | |
|---|---|---|---|
| | LOW-SPEED BIT RATE | MEDIUM-SPEED BIT RATE | HIGH-SPEED BIT RATE |
| 1 | 40 | 0 | 0 |
| 2 | 38 | 1 | 0 |
| 3 | 37 | 1 | 1 |
| ...... | ...... | ...... | ...... |
| N | 0 | 0 | 28 |

RADIO BASE STATION FOR A CDMA MOBILE COMMUNICATION SYSTEM

BACKGROUND OF THE INVENTION

The present invention generally relates to radio base stations, and more particularly to a radio base station for a CDMA (Code Division Multiple Access) mobile communication system, which uses the CDMA transmission technique to enable transmission at a plurality of different bit rates.

According to the CDMA transmission technique, a signal is first subjected to a spreading process using an allocated code and is then transmitted. Unlike the FDMA transmission technique and the TDMA transmission technique, the CDMA transmission technique performs the communication while tolerating interferences from other radio channels up to a predetermined tolerable target line quality value. The line quality is determined by a ratio of "(Eb/No)", where Eb is the signal power per a single information bit and No is the noise power.

The noise power No mainly includes interference noise from other mobile stations MS, which perform radio communications with the same radio base station BS. This interference noise is particularly dependent upon the number of radio channels simultaneously set in a direction (reverse link) from the mobile station MS to the radio base station BS.

Accordingly, in order to maintain a particular line quality, the number of mobile stations MS simultaneously communicating with the same radio base station BS must be limited. Even if a sufficient margin exists in the hardware when carrying out the transmission process, the line quality may deteriorate and a failure such as a disconnection may occur if calls exceeding the above described limit are accepted.

For this reason, a maximum radio channel number Nrmax which can be allocated is theoretically calculated and set based on experience. This maximum radio channel number Nrmax is set with respect to the radio bases station BS. Further, the allocation of a radio channel is rejected with respect to a new call generated after allocating the maximum radio channel number Nrmax with respect to the calls.

On the other hand, in a mobile communication system using the CDMA transmission technique, there are additional demands to provide information transmission service beyond a basic bit rate of 8 kb/s. For example, an information transmission service at a higher bit rate such as 13 kb/s may be required to improve communication quality or to realize high-speed data communications.

When providing information transmission services at a plurality of different bit rates, the bit rate to be used is arranged between the radio base station BS and the mobile station MS when setting up the call. Therefore, the communication is made at the bit rate determined by this arrangement.

For example, when information transmission services using two different bit rates are provided in the mobile communication system, the transmission cannot be made at the bit rate of 13 kb/s if either the radio base station BS or the mobile station MS cannot support the information transmission service at the bit rate of 13 kb/s. Thus, the transmission in this case is made at the basic bit rate of 8 kb/s. On the other hand, if both the radio base station BS and the mobile station MS both support the information transmission service at the bit rate of 13 kb/s, the transmission can be made at the bit rate of 13 kb/s.

However, since a transmission output of the mobile station MS is suppressed to less than a predetermined value, the signal power Eb per one information bit becomes smaller as the bit rate becomes higher. For this reason, in order to maintain the same line quality (Eb/No) even when the transmission is made at the higher bit rate, it is necessary to reduce the interference noise of mobile stations MS that can be connected simultaneously to the radio base station BS. In other words, the maximum radio channel number Nrmax that can be allocated, must be small compared to the case where the transmission is made at the lower bit rate.

Accordingly, in a conventional mobile communication system in which a plurality of bit rates are used, the maximum radio channel number Nrmax that can be allocated is set by assuming a case where all of the radio channels are allocated to the calls requesting the higher bit rate. The allocation of a radio channel is rejected with respect to a call generated after allocating the maximum radio channel number Nrmax with respect to the calls.

However, when the maximum radio channel number Nrmax that can be allocated is set by assuming the case where all of the radio channels are allocated to the calls requesting the high bit rate and the allocation of the radio channel is rejected with respect to the call generated after allocating the maximum radio channel number Nrmax with respect to the calls, the utilization efficiency of the radio channels is low.

In other words, in actual practice, there are many cases where a large number of calls for information transmission service at the lower bit rate are included among the calls. In such cases, there is usually no immediate undesirable effect on the line quality even if the radio channels are newly allocated to the calls by accepting the number of calls exceeding the maximum radio channel number Nrmax that can be allocated by the radio base station BS.

Therefore, according to the above described method of setting the maximum radio channel number Nrmax which can be allocated, the resources of the radio channel are not utilized effectively to the limit. The number of mobile stations MS that can be accommodated by one radio base station BS is an important factor which directly affects the cost of the equipment per subscriber of the mobile station MS. The effective utilization of the resources of the radio channels can reduce the cost of the entire mobile communication system, which could greatly affect the rates or charges of the services.

SUMMARY OF THE INVENTION

Accordingly, it is an object of the present invention to provide a useful radio base station for a CDMA mobile communication system, in which the problems described above are eliminated.

Another and more specific object of the present invention is to provide a radio base station for a CDMA mobile communication system which provides information transmission services at a plurality of different bit rates, wherein resources of radio channels are effectively utilized by efficiently allocating the radio channels so that a large number of calls can be accepted.

These and other objects are met by providing a radio base station in a CDMA mobile communication system for making a radio communication among mobile stations at a plurality of different bit rates. The base station according to the present invention including a storage part for storing a maximum number of radio channels that makes a signal-to-interference noise power ratio for each channel greater than a predetermined value. The maximum number of radio channels having a value which changes in steps depending on the bit rate used for a call presently made. A control part for reading the maximum value stored in the storage part and allocating radio channels to the mobile stations in a range which does not exceed the maximum value. According to the radio base station of the present invention, it is possible to increase the number of subscribers of the mobile stations that can be accommodated per sector or cell. In addition, it is possible to reduce undesirable instances where the line is busy due to traffic. Therefore, it is possible to increase the number of mobile station subscribers which can be accommodated at a lower cost, without the need to modify and increase the transmission equipment such as by increasing the number of radio frequencies.

The storage part may store a data table including combinations of limit values for the number of radio channels for each of the bit rates used. The control part may refer to the data table with respect to a radio channel allocation request and accept a call only when the number of radio channels already allocated is less than a limit value corresponding to the bit range of the call stored in the data table.

The storage part may also store a reference value, which is smaller than a maximum number of radio channels that corresponds to the signal-to-interference noise ratio being greater than the predetermined value when all calls which are made using the highest bit rate. In this case, the control part may allocate a radio channel only at a basic bit rate which is lower than the highest bit rate with respect to a call which is generated in a state where the number of radio channels allocated exceeds the reference value.

The control part may also allocate with respect to a mobile station, a radio channel at a lower bit rate than the bit rate requested by a radio channel allocation request. This allocation would apply to the case where the number of radio channels already allocated at the lower bit rate is less than the limit value stored in the data table and the number of radio channels already allocated at the bit rate requested by the ratio channel allocation request exceeds the limit value stored in the data table.

The storage part may also store a data table including combinations of limit values of the number of radio channels for each of the bit rates used. The control part may allocate with respect to a mobile station a radio channel at a lower bit rate than requested by a radio channel allocation request. This allocation would apply to the case where the number of radio channels already allocated is less than the limit value stored in the data table and the number of radio channels already allocated exceeds the limit value stored in the data table at the bit rate requested by the radio channel allocating request.

Other objects and further features of the present invention will be apparent from the following detailed description when read in conjunction with the accompanying drawings.

BRIEF DESCRIPTION OF THE DRAWINGS

FIG. 6 is a diagram showing a data table of a maximum number of radio channels allocated in a second embodiment of the present invention;

DESCRIPTION OF THE PREFERRED EMBODIMENTS

Figure 1:
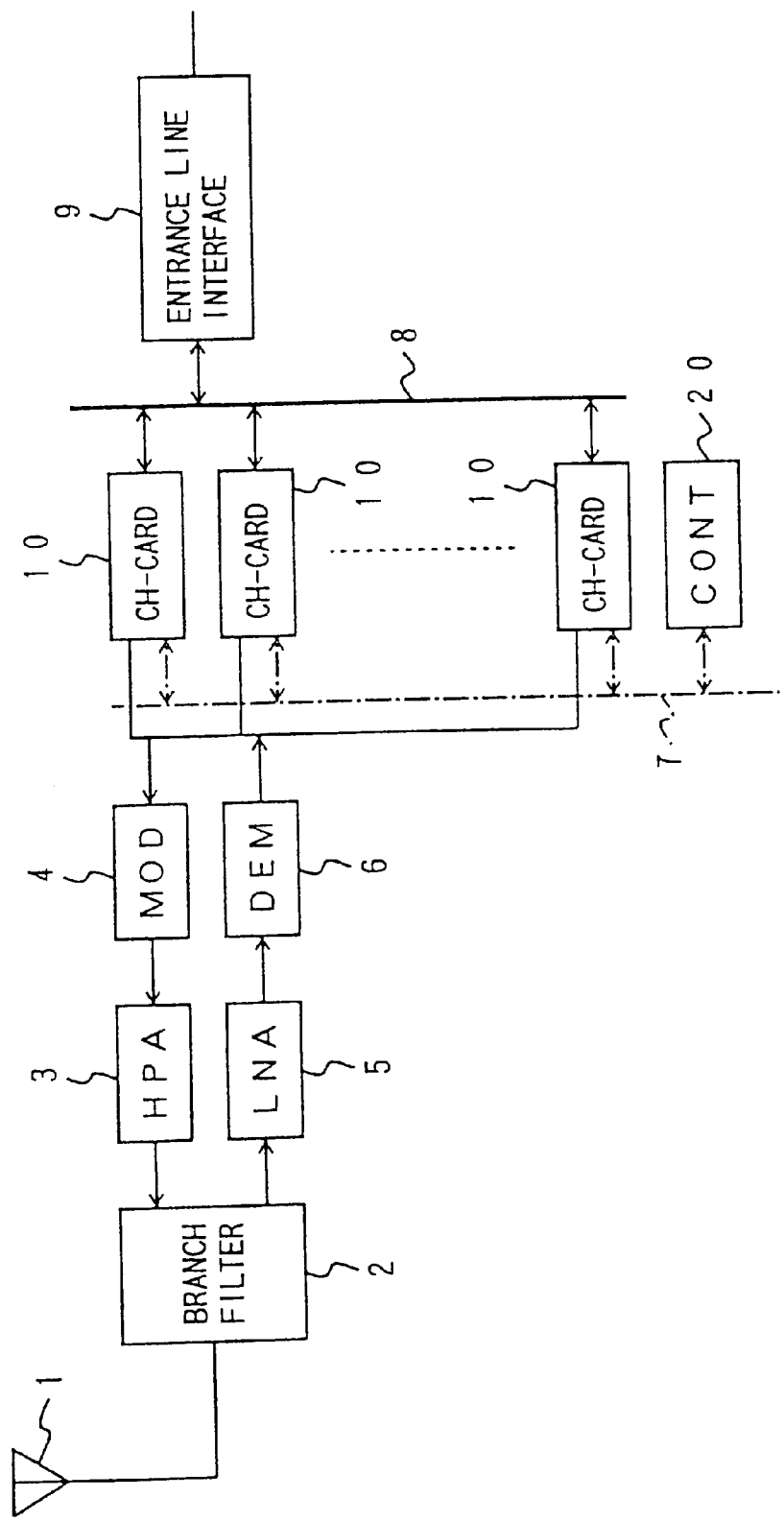
FIG. 1 is a system block diagram showing the construction of a radio base station for a CDMA mobile communication.

FIG. 1 is a system block diagram showing a radio base station for a CDMA mobile communication system. The radio base station includes an antenna 1, a branching filter 2, a high power amplifier (HPA) 3, a modulator (MOD) 4, a low noise amplifier 5, a demodulator (DEM) 6, a control bus 7, a data traffic bus 8, an entrance line interface 9, channel cards (CH-CARD) 10, and a control unit (CONT) 20, which are connected as shown.

One channel card 10 accommodates a plurality of radio channels. Each channel card 10 is connected to the entrance line interface 9 via the data traffic bus 8. Further, each channel card is also connected to the control unit 20 via the control bus 7. Each channel card 10 is also connected to the modulator 4 and the demodulator 6. A radio channel is allocated to one of the channel cards 10 by the control unit 20 via the control bus 7. The control unit 20 includes a storage part and a control part. The storage part of the control unit 20 stores maximum values of the number of radio channels corresponding to particular bit rate for maintaining a signal-to-noise power ratio greater than a predetermined value. The control part of the control unit 20 controls the allocation of the radio channels to maintain the signal-to-noise power ratio greater than the predetermined value every time a new call is generated, in correspondence with the bit rate of the radio channel in use.

The antenna 1, the branching filter 2, the high power amplifier 3, the modulator 4, the low noise amplifier 5 and the demodulator 6 are used in common by all of the radio channels.

A signal received from the antenna 1 passes through the branching filter 2, the low noise amplifier 5 and the demodulator 6, and is subjected to a reverse diffusion by an allocated code in the channel card 10. The code is allocated to the channel card by the control unit 20. Hence, the signal subjected to the reverse diffusion is output to the data traffic bus 8 and is then transmitted to the entrance line via the entrance line interface 9.

A transmitted data signal received by the entrance line interface 9 passes through the data traffic bus 8, and is subjected to a diffusion by an allocated code in the channel card 10. The code is again allocated to the channel card 10 by the control unit 20. The data signal subjected to the diffusion passes through the modulator 4, the high power amplifier 3 and the branching filter 2, and is then transmitted via the antenna 1.

Figure 2:
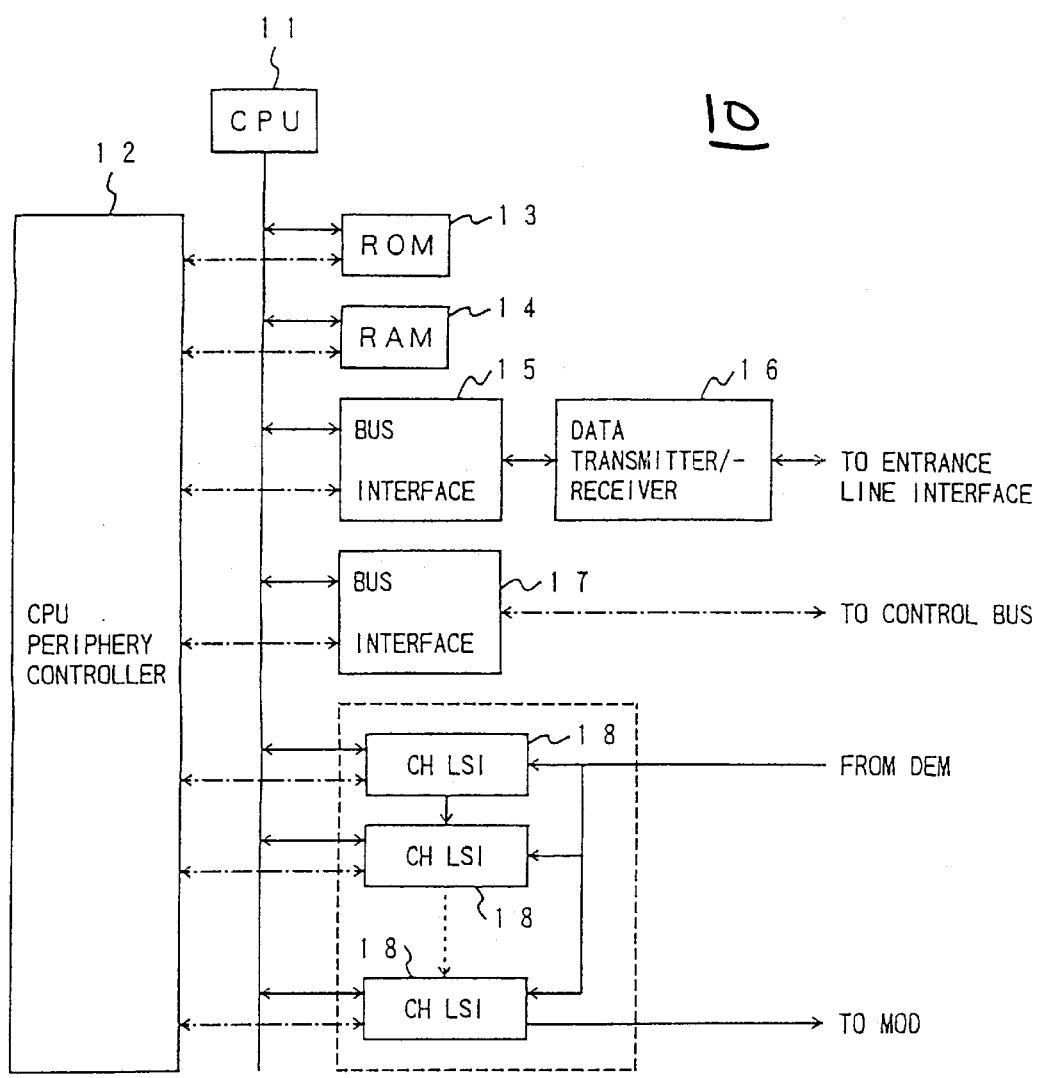
FIG. 2 is a system block diagram showing the construction of a channel card.

FIG. 2 is a system block diagram showing the configuration of the channel card 10 shown in FIG. 1. The channel card 10 shown in FIG. 2 includes a central processing unit (CPU) 11, a CPU periphery controller 12, a read only memory (ROM) 13, a random access memory (RAM) 14, bus interfaces 15, 17, a data transmitter/receiver 16, and a plurality of channel circuits (CH-LSI) 18, which are connected as shown.

Each channel circuit 18 is configured to perform diffusion and reverse diffusion processes with respect to one radio channel. In other words, the channel circuit 18 subjects a signal from the demodulator 6 to reverse diffusion and decoding, and then transmits the decoded data to the entrance line interface 9 via the bus interface 15 and the data transmitter/receiver 16. On the other hand, transmitting data received from the entrance line interface 9 is input to one channel circuit 18 via the data transmitter/receiver 16 and the bus interface 15. The transmitting data is then subjected to the diffusion in the channel circuit 18 and then transmitted to the modulator 4.

The CPU 11 controls the plurality of channel circuits 18 using the ROM 13 and the RAM 14 in order to carry out CDMA signal processing for each radio channel by operating the channel circuits 18.

Figure 3:
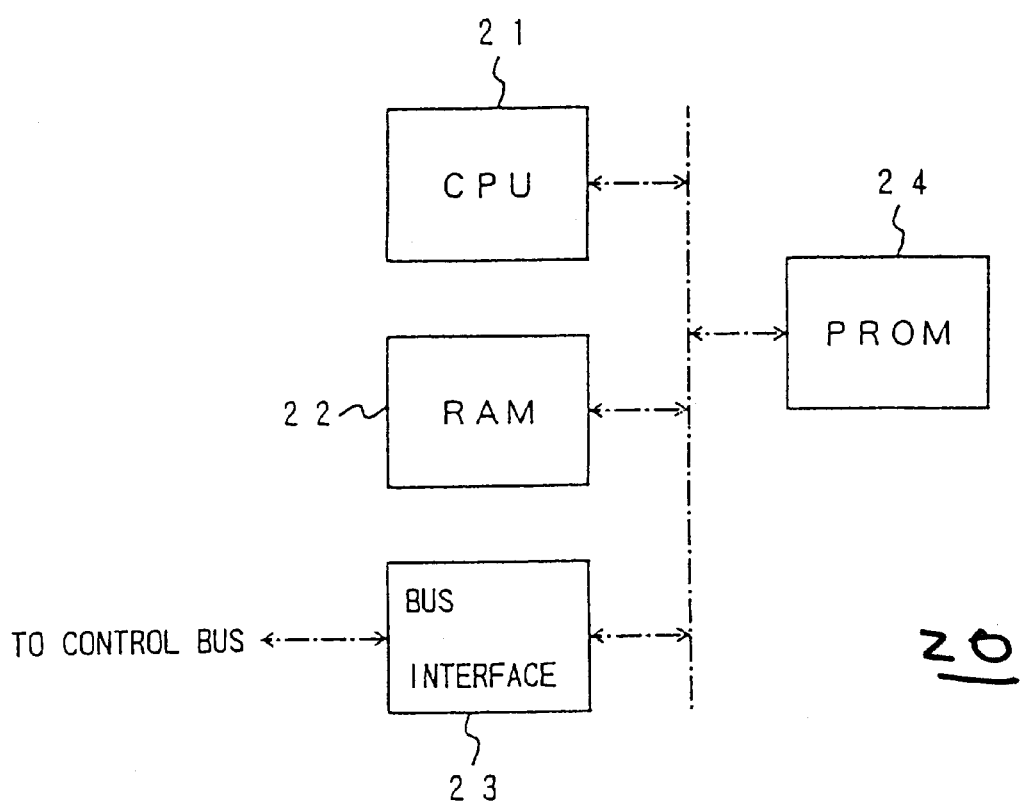
FIG. 3 is a system block diagram showing the construction of a control unit.

FIG. 3 is a system block diagram showing the construction of the control unit 20 shown in FIG. 1. The control unit 20 shown in FIG. 3 includes a CPU 21, a RAM 22, a control bus interface 23, and a programmable read only memory (PROM) 24, which are connected as shown.

The RAM 22 stores control programs to be executed by the CPU 21. The PROM 24 stores control programs to be executed by the CPU 21, and data information including various parameters or tables. The CPU 21 allocates the radio channel to the transmitting/receiving data traffic based on the control programs and control parameters stored in the PROM 24.

Figure 4:
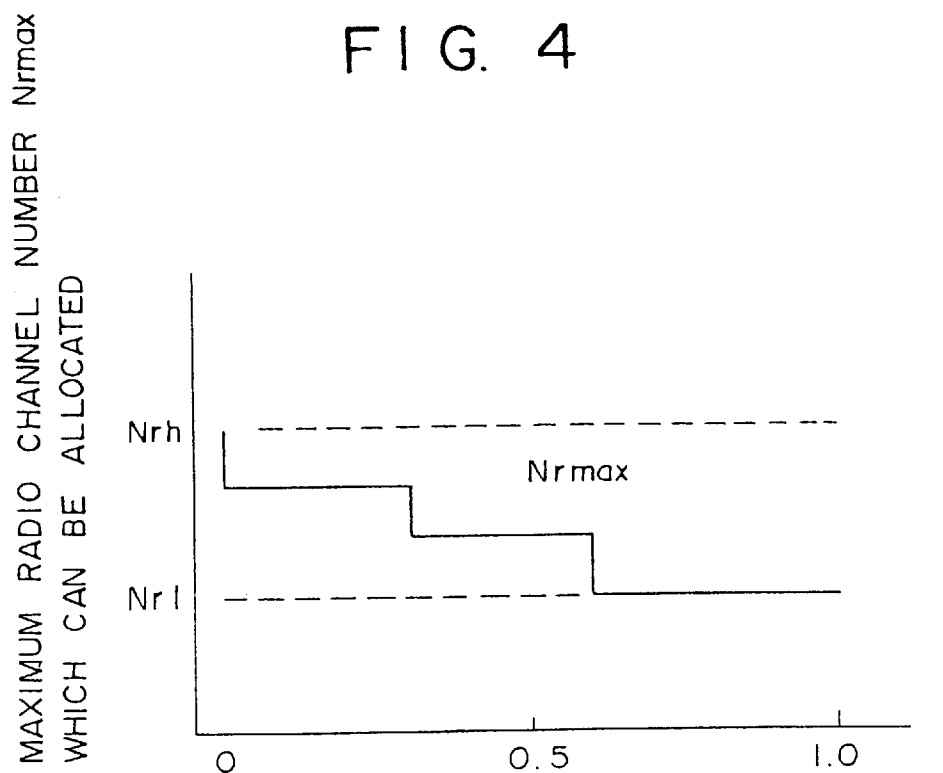
FIG. 4 is a diagram showing an upper limit value for a number of radio channels allocated in a first embodiment of the present invention.
Figure 5:
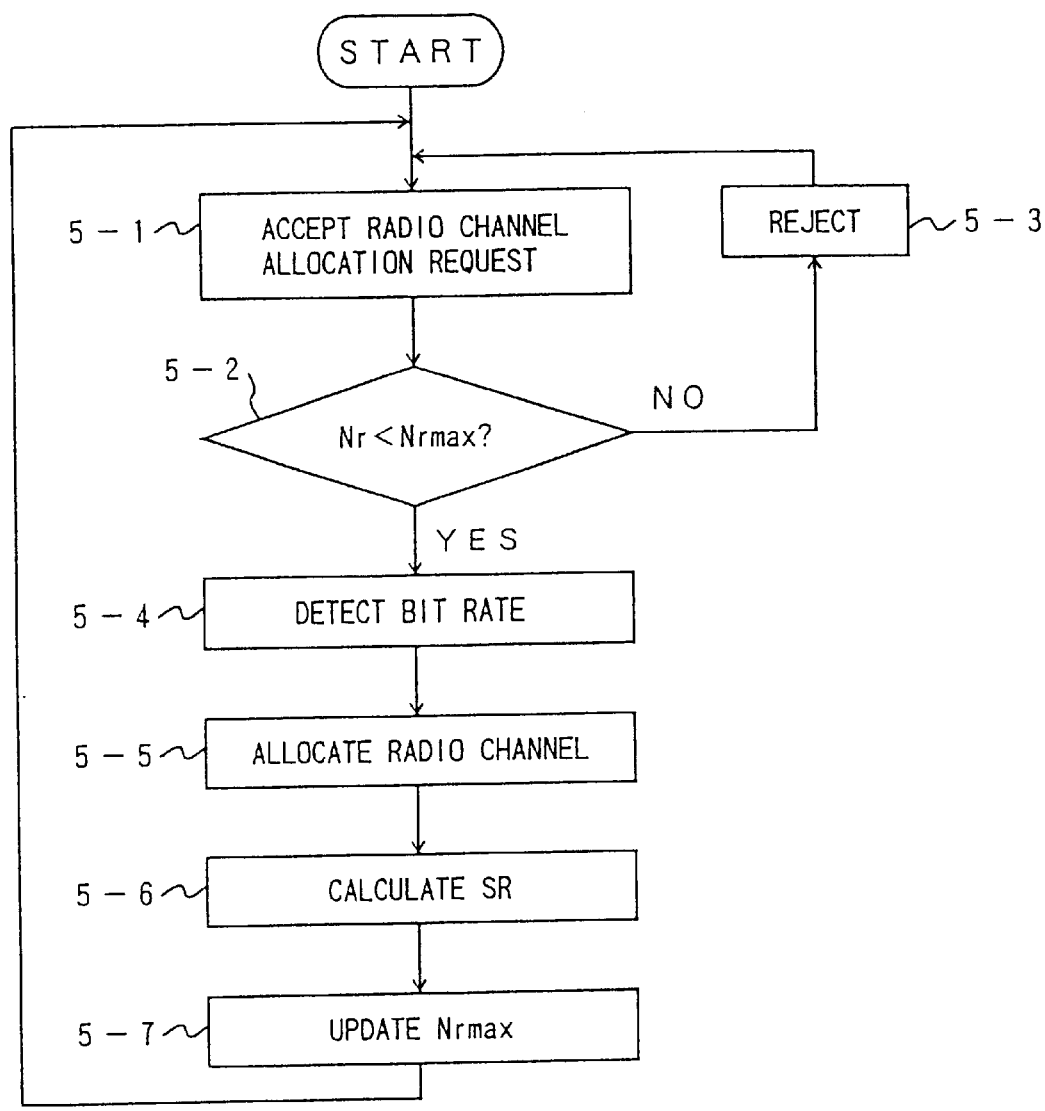
FIG. 5 is a flow chart showing a radio channel allocating process of the first embodiment of the present invention.

FIG. 4 is a diagram showing upper limit values for a number of radio channels allocated in a first embodiment of the present invention. In addition, FIG. 5 is a flow chart showing a radio channel allocating process for the first embodiment of the present invention. The first embodiment of the present invention will now be described with reference to FIGS. 4 and 5.

In FIG. 4, the abscissa indicates a ratio R of calls having a higher bit rate with respect to a basic bit rate, and the ordinate indicates a maximum radio channel number Nrmax which can be allocated. As indicated by a solid line in FIG. 4, the maximum radio channel number Nrmax which can be allocated is changed in steps depending on the ratio R of the calls having the higher bit rate compared to the basic bit rate.

In FIG. 4, Nrh indicates a maximum tolerable radio channel number that can be allocated when the radio channels are all allocated at a minimum bit rate such as the basic bit rate. On the other hand, Nrl indicates a maximum tolerable radio channel number that can be allocated when the radio channels are all allocated at a maximum bit rate with respect to all calls.

As previously described, the signal power Eb per single information bit becomes smaller as the bit rate becomes higher. Hence, the maximum radio channel number Nrmax which can be allocated is reduced in steps as the ratio of the calls requesting the information transmission at the bit rate increases. This causes the interference noise power No to be reduced so that a predetermined line quality (Eb/No) is maintained. On the other hand, when the ratio of the calls requesting the information transmission at the higher bit rate is low, the maximum radio channel number Nrmax which can be allocated is increased, so that a large number of calls can be accommodated.

The maximum radio channel number Nrmax that can be allocated, which changes depending on the ratio of the calls having the high bit rate as shown in FIG. 4, is prestored in the PROM 24 or the RAM 22. The PROM 24 and the RAM 22 forms the storage part of the control unit 20, as shown in FIG. 3.

The control unit 20 carries out the radio channel allocating process with respect to a new call, based on the above described maximum radio channel number Nrmax that can be allocated. A description of this radio channel allocating process will now be described with reference to FIG. 5.

As shown in FIG. 5, when the CPU 21 of the control unit 20 generates a new call, step 5-1 accepts a radio channel allocation request. Step 5-2 decides whether or not a radio channel number Nr presently allocated is less than the maximum radio channel number Nrmax which can be allocated. If the radio channel number Nr has reached the maximum radio channel number Nrmax and the decision result in the step 5-2 is NO, a step 5-3 rejects the allocation of the radio channel, and the process returns to the step 5-1.

On the other hand, if the decision result in the step 5-2 is YES, a step 54 detects a bit rate requested by the call. A step 5-5 then allocates a radio channel and makes a connection.

A step 5-6 then calculates a bit rate structure ratio SR of the calls presently connected, including the newly connected call. A step 5-7 then updates the maximum radio channel number Nrrnax that can be allocated depending on the bit rate structure ratio SR. The process thereafter returns to the step 5-1 to prepare for the next call generated.

For example, if presently there are Ns calls having the bit rate of 8 kb/s and $N_{13}$ calls having the bit rate of 13 db/s and the bit rate requested by the new call detected is 13 kb/s, the step 5-6 calculates the bit rate structure ratio SR based on the following formula:

$$SR=(N_{13}+1)/(N_8+N_{13}+1).$$

The step 5-7 reads from the PROM 24 a maximum radio channel number Nrmax, which can be allocated that corresponds to the bit rate structure ratio SR calculated in the above described step 5-6. The step 5-6 further updates the maximum radio channel number Nrmax with the newly read maximum radio channel number Nrmax.

According to this first embodiment of the present invention, the bit rate structure ratio SR of the bit rates used is calculated, and the maximum radio channel number Nrmax which can be allocated is changed depending on the bit rate structure ratio SR. Since the prior art only accommodates up to a maximum radio channel number Nrl allocated at the maximum bit rate with respect to all of the calls, this embodiment increases the maximum radio channel number Nrmax allocated within a range that does not actually deteriorate the line quality of the channels.

Figure 7:
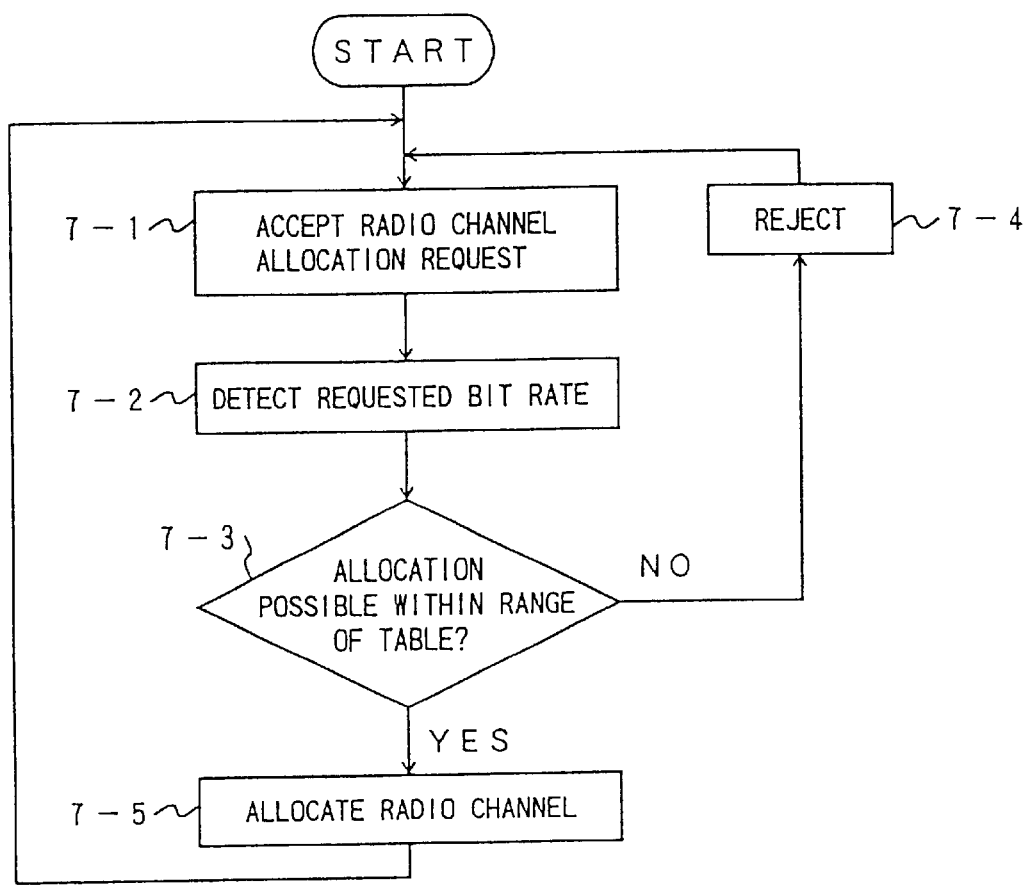
FIG. 7 is a flow chart showing the radio channel allocating process of the second embodiment of the present invention.

FIG. 6 is a diagram showing a data table of maximum numbers of radio channels that can be allocated in a second embodiment of the present invention. In addition, FIG. 7 is a flow chart for explaining the radio channel allocating process of the second embodiment of the present invention. A description will now be given of the second embodiment of the present invention, by referring to FIGS. 6 and 7.

In this second embodiment, it is assumed for the sake of convenience that three kinds of bits rates, namely, a low-speed, a medium-speed and a high-speed, can be used. In the data table of the maximum radio channel number which can be allocated shown in FIG. 6, a combination of the radio channel numbers allocated is stored with respect to each combination number. In other words, the data table shown in FIG. 6 stores all combinations of the limit values of the radio channel numbers. In other words, the maximum radio channel numbers which can be allocated to the calls of the respective bit rates for radio channels allocated at the three kinds of bit rates including low-speed, medium-speed and high-speed.

For example, a combination number "1" shown in FIG. 6 indicates that 40 radio channels can be allocated for the calls having the low-speed bit rate, 0 radio channels can be allocated for the calls having the medium-speed bit rate, and 0 radio channels can be allocated for the calls having the high-speed bit rate. Similarly, a combination number "2" indicates that 38 radio channels can be allocated for the call having the low-speed bit rate, 1 radio channel can be allocated for the call having the medium-speed bit rate, and 0 radio channels can be allocated for the call having the high-speed bit rate. A combination number "3" indicates that 37 radio channels can be allocated for the call having the low-speed bit rate, 1 radio channel can be allocated for the call having the medium-speed bit rate, and 1 radio channel can be allocated for the call having the high-speed bit rate. Further, a combination number "N" indicates that 0 radio channels can be allocated for the call having the low-speed bit rate, 0 radio channel can be allocated for the call having the medium-speed bit rate, and 28 radio channels can be allocated for the call having the high-speed bit rate.

In order to maintain the predetermined line quality Eb/No, it is necessary to reduce the number of radio channels allocated for the calls having the high bit rate. While the limit value of the number of radio channels that can be allocated is 28 in a case where only the calls having the high bit rate are allocated to all of the radio channels. The limit value of the number of radio channels that can be allocated becomes 40 where only the calls having the low bit rate are allocated to the radio channels.

The data table shown in FIG. 6 is stored in the PROM 24, which forms the storage part of the control unit 20 shown in FIG. 3. Based on the limit values stored in the data table which is the maximum radio channel numbers Nrmax that can be allocated, the CPU 21 performs the radio channel allocating process with respect to the new call. The CPU 21 is the control part of the control unit. The radio channel allocating process will now be described with reference to FIG. 7.

As shown in FIG. 7, when the CPU 21 of the control unit 20 generates a new call, step 7-1 accepts a radio channel allocation request. A step 7-2 then detects the bit rate requested by the call.

Next, a step 7-3 references the data table shown in FIG. 6, and decides whether or not the combination of the radio channel numbers for each of the bit rates allocated including the new call falls within the range of the combination of the limit values of the radio channel numbers stored in the data table. In other words, the maximum radio channel numbers which can be allocated for the respective bit rates. If the decision result in the step 7-3 is NO, a step 7-4 rejects the allocation of the radio channel, and the process returns to the step 7-1.

On the other hand, if the decision result in the step 7-3 is YES, a step 7-5 allocates a radio channel and makes a connection. Thereafter, the process returns to the step 7-1 to prepare for a next call generated.

According to this second embodiment of the present invention, the data table of the combinations of the limit values of the radio channel numbers corresponding to the maximum radio channel numbers that can be allocated for each of the bit rates used is stored in the PROM 24 or the RAM 22. The radio channel allocation is carried out by referring to this data table. As a result, even in a case where only 28 radio channels can be allocated according to the prior art allocation method, it is possible to increase the number of radio channels that can be allocated depending on the combination of the bit rates, without deteriorating line quality.

Figure 8:
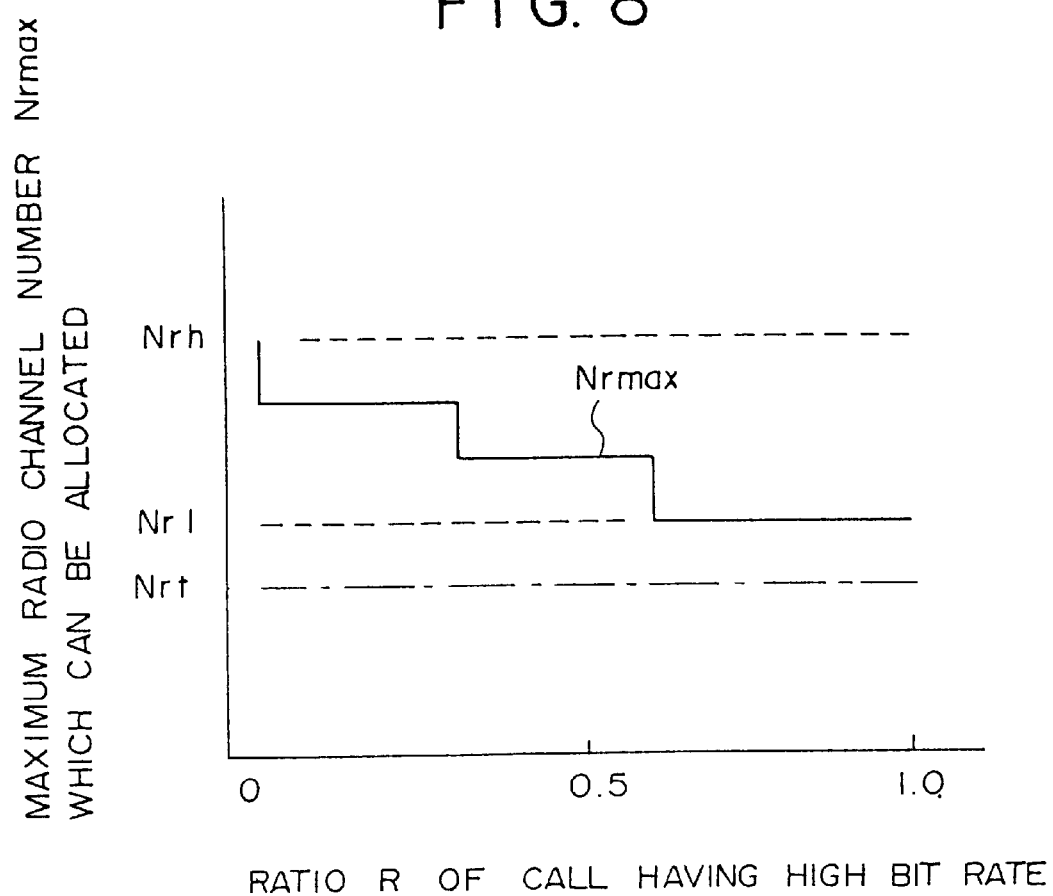
FIG. 8 is a diagram showing a reference value of the number of radio channels allocated in a third embodiment of the present invention.
Figure 9:
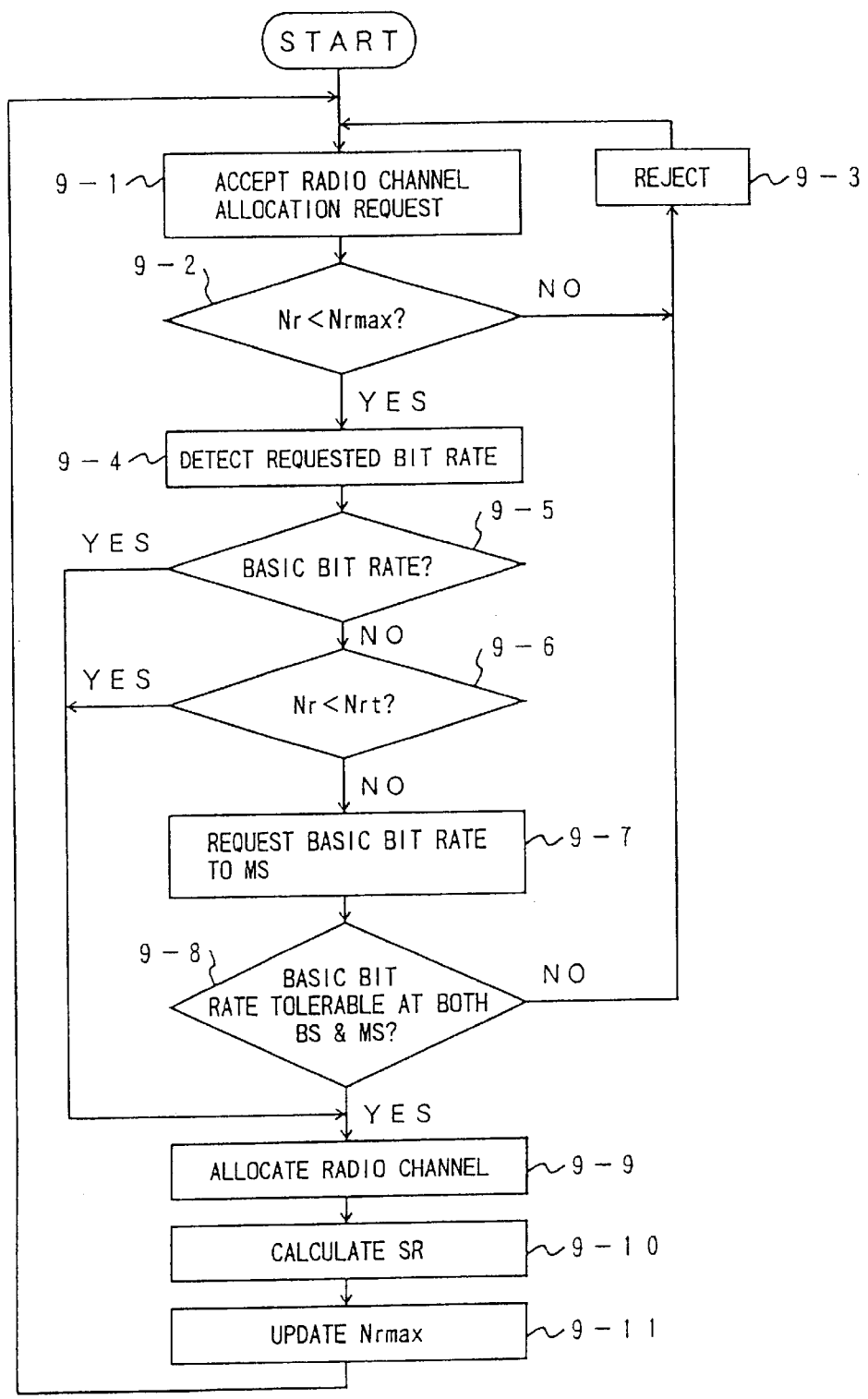
FIG. 9 is a flow chart showing the radio channel allocating process of the third embodiment of the present invention.

FIG. 8 is a diagram showing a reference value of the number of radio channels allocated in a third embodiment of the present invention. In addition, FIG. 9 is a flow chart for explaining the radio channel allocating process of the third embodiment of the present invention. A description will now be given of the third embodiment of the present invention, by referring to FIGS. 8 and 9.

In FIG. 8, the abscissa indicates a ratio R of calls having a higher bit rate with respect to a basic bit rate. The ordinate indicates a maximum radio channel number Nrmax which can be allocated, similarly to FIG. 4 described above. As indicated by a solid line in FIG. 8, the maximum radio channel number Nrmax that can be allocated is changed in steps depending on the ratio R of the calls having the higher bit rate compared to the basic bit rate.

In FIG. 8, Nrh indicates a maximum tolerable radio channel number which can be allocated when the radio channels are all allocated at a minimum bit rate such as the basic bit rate, similarly to FIG. 4. On the other hand, Nrl indicates a maximum tolerable radio channel number that can be allocated at a maximum bit rate with respect to all calls, similarly to FIG. 4.

Furthermore, Nrt shown in FIG. 8 indicates a reference value of the number of radio channel number Nrmax that can be allocated. With respect to a call generated when reference value Nrt is exceeded, measures are taken so that only the information transmission service at the basic bit rate of 8 kb/s is provided.

The reference value Nrt and the maximum radio channel number Nrmax that can be allocated are stored in the PROM 24 or the RAM 22 of the control unit 20 shown in FIG. 3. This enables the CPU 21 of the control unit 20 to read the stored reference value Nrt and the maximum radio channel number Nrmax that can be allocated to perform the radio channel allocating process with respect to the new call. This radio channel allocating process will now be described with reference to FIG. 9.

As shown in FIG. 9, when a CPU 21 of the control unit 20 generates a new call, a step 9-1 accepts a radio channel allocation request. A step 9-2 decides whether or not a radio channel number Nr presently allocated is less than the maximum radio channel number Nrmax that can be allocated. If the radio channel number Nr has reached the maximum radio channel number Nrmax and the decision result in the step 9-2 is NO, a step 9-3 rejects the allocation of the radio channel, and the process returns to the step 9-1.

On the other hand, if the decision result in the step 9-2 is YES, a step 9-4 detects a bit rate requested by the call. A step 9-5 decides whether or not the requested bit rate is the basic bit rate. If the decision result in the step 9-5 is YES, the process advances to a step 9-9, which allocates a radio channel and makes a connection.

If the decision result in the step 9-5 is NO, a step 9-6 decides whether or not the radio channel number Nr already allocated at the present is less than the reference value Nrt described above. If the decision result in the step 9-6 is YES, the process advances to the step 9-9 which allocates a radio channel and makes a connection.

On the other hand, if the decision result in the step 9-6 is NO, a step 9-7 requests that the mobile station MS performs a communication at the basic bit rate. In addition, a step 9-8 decides whether or not the transmission at the basic bit rate can be tolerated at both the radio base station BS and the mobile station MS. If the decision result in the step 9-8 is NO, the step 9-3 rejects the allocation of the radio channel, and the process returns to the step 9-1.

If the decision result in the step 9-8 is YES, the step 9-9 allocates a radio channel and makes a connection. Furthermore, a step 9-10 calculates a bit rate structure ratio SR of the calls which are presently connected including the newly connected call. A step 9-11 updates the maximum radio channel number Nrmax which can be allocated depending on the bit rate structure ratio SR, and the process thereafter returns to the step 9-1 to prepare for a next call generated.

In the steps 9-7 and 9-8, the CPU 21 may operate so that the radio base station BS responds to the mobile station MS as a radio base station that only supports the lower bit rate, that is, the basic bit rate. The step 9-10 may calculate the bit rate structure ratio SR similarly to the step 5-6 shown in FIG. 5 described above in conjunction with the first embodiment of the present invention, and a description thereof will be omitted for this third embodiment of the present invention.

According to the third embodiment of the present invention, when the number of radio channels in use approaches the upper limit value of the radio channels that can be allocated due to the restriction of maintaining a particular line quality, the information transmission service is limited to the basic bit rate which can accommodate a large number of calls, with respect to the newly generated call. For this reason, it is possible to increase the number of calls that can be connected by introducing the restriction with respect to the high-quality audio transmission and high-speed data transmission, to prevent service deterioration such as the inability to connect a newly generated call.

In FIG. 8, the reference value Nrt is a constant value with respect to the ratio of the calls having the high bit rate. However, the reference value Nrt does not have to be a constant value, and may be appropriately set to a value which is smaller than the maximum radio channel number Nrmax that can be allocated. For example, the reference value Nrt may be set to a value which is obtained by subtracting a constant value from the maximum radio channel number Nrmax that can be allocated or, alternatively, set to a value that is obtained by multiplying a ratio less than "1" to the maximum radio channel number Nrmax that can be allocated.

Figure 10:
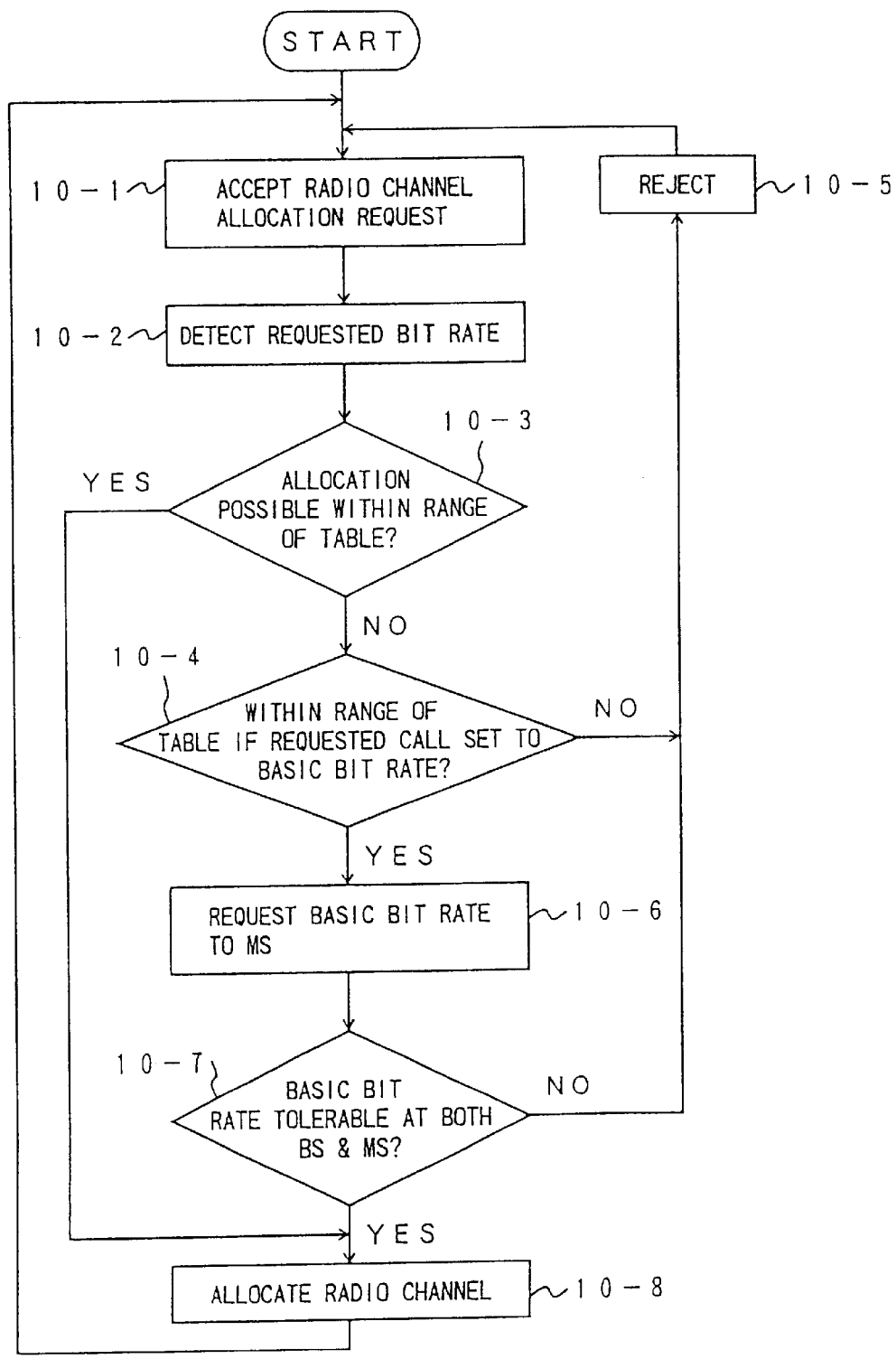
FIG. 10 is a flow chart showing the radio channel allocating process of a fourth embodiment of the present invention.

FIG. 10 is a flow chart showing the radio channel allocating process of a fourth embodiment of the present invention. The radio channel allocating process of this fourth embodiment of the present invention will now be described with reference to FIG. 10.

As shown in FIG. 10, when the CPU 21 of the control unit 20 generates a new call, a step 10-1 accepts a radio channel allocation request. A step 10-2 then detects a bit rate requested by the call.

A step 10-3 references the data table shown in FIG. 6, and then decides whether or not the combination of the radio channel numbers including the new call falls within the range of the combination of the limit values of the radio channel numbers stored in the data table 10 which is the maximum number of radio channels that can be allocated for the respective bit rates. The data table is stored in the PROM 24.

If the decision result in the step 10-3 is NO, a step 10-4 decides whether or not the value falls within the range of the limit value stored in the data table when the bit rate of the call requesting the radio channel allocation is changed to the basic bit rate. If the decision result in the step 10-4 is NO, a step 10-5 rejects the allocation of the radio channel and the process returns to the step 10-1.

On the other hand, if the decision result in the step 10-4 is YES, a step 10-6 requests information transmission at the basic bit rate with respect to the mobile station MS. A step 10-7 then decides whether or not a transmission at the basic bit rate is tolerated at both the radio base station BS and the mobile station MS. If the decision result in the step 10-7 is NO, the step 10-5 rejects the allocation of the radio channel, and the process returns to the step 10-1.

If the decision result in the step 10-7 is YES, the step 10-8 allocates a radio channel and makes a connection. The process thereafter returns to the step 10-1 to prepare for a next call which is generated.

According to this fourth embodiment of the present invention, a call that cannot be accepted at the higher bit rate due to a radio base station already being near the limit of call accommodation, is allocated to a radio channel at a reduced bit rate. As a result, it is possible to carry out a control so that a connection is possible even with respect to a call that originally would be impossible to connect due to the state of the radio base station.

Further, the present invention is not limited to these embodiments, but various variations and modifications may be made without departing from the scope of the present invention.

What is claimed is:

1. A radio base station for allocating radio channels to mobile stations at more than one bit rate in a CDMA mobile communication system, said base station comprising:
   a storage part storing a maximum number of radio channels allocated in order to maintain a predetermined signal-to-noise power ratio for each of the radio channels, and storing a reference value; and
   a control part allocating the radio channels according to said maximum number of radio channels in response to an incoming call, and allocating the radio channels at a basic rate in response to the incoming call if the reference value is less than a number of presently assigned radio channels.

2. The base station of claim 1, wherein said reference value is smaller than said maximum number of radio channels.

3. The base station of claim 1, wherein said control part allocates the radio channel at the basic rate if a transmission at the basic rate is tolerated by said base station and a mobile station to receive the incoming call.

4. The base station of claim 1, wherein said maximum number of radio channels are configured as a table including combinations of limit values, wherein each of said combinations of limit values include a maximum number of radio channels allocated for each of the more than one bit rate.

5. The base station of claim 4, wherein said control part allocates a radio channel at a basic bit rate in response to the incoming call if the incoming call has a bit rate that is not within the combinations of limit values.

6. The base station of claim 5, wherein said control part allocates the radio channel at the basic rate if a transmission at the basic rate is tolerated by said base station and a mobile station to receive the incoming call.

7. A method of allocating radio channels to mobile stations at more than one bit rate in a CDMA mobile communication system, said method comprising the steps of:
   determining a maximum number of radio channels allocated in order to maintain a predetermined signal-tonoise power ratio for each of the radio channels, and determining a reference value; and allocating the radio channels according to said maximum number of radio channels in response to an incoming call, and allocating the radio channels at a basic rate in response to the incoming call if the reference value is less than a number of presently assigned radio channels.

8. The method of claim 7, wherein said reference value is smaller than said maximum number of radio channels.

9. The method of claim 7, wherein the radio channel is allocated at the basic rate if a transmission at the basic rate is tolerated by a mobile station to receive the incoming call.

10. The method of claim 7, wherein said maximum number of radio channels are configured as a table including combinations of limit values, wherein each of said combinations of limit values include a maximum number of radio channels allocated at each of the more than one bit rate.

11. The method of claim 10, wherein the radio channel is allocated at a basic bit rate in response to the incoming call if the incoming call has a bit rate that is not within the combinations of limit values.

12. The method of claim 11, wherein the radio channel is allocated at the basic rate if a transmission at the basic rate is tolerated by a mobile station to receive the incoming call.

* * * * *